(12) United States Patent
McDaniel et al.

(10) Patent No.: US 9,096,699 B2
(45) Date of Patent: Aug. 4, 2015

(54) METHODS OF PREPARING A CATALYST

(75) Inventors: Max P. McDaniel, Bartlesville, OK (US); Kathy S. Collins, Bartlesville, OK (US)

(73) Assignee: CHEVRON PHILLIPS CHEMICAL COMPANY LP, The Woodlands, TX (US)

( * ) Notice: Subject to any disclaimer, the term of this patent is extended or adjusted under 35 U.S.C. 154(b) by 786 days.

(21) Appl. No.: 13/310,570

(22) Filed: Dec. 2, 2011

(65) Prior Publication Data

US 2013/0144017 A1    Jun. 6, 2013

(51) Int. Cl.
| C08F 4/18 | (2006.01) |
| C08F 4/02 | (2006.01) |
| C08F 10/02 | (2006.01) |
| C08F 110/02 | (2006.01) |

(52) U.S. Cl.
CPC .................................. *C08F 110/02* (2013.01)

(58) Field of Classification Search
None
See application file for complete search history.

(56) References Cited

U.S. PATENT DOCUMENTS

| 3,248,179 A | 4/1966 | Norwood |
| 3,622,521 A | 11/1971 | Hogan et al. |
| 3,875,079 A | 4/1975 | Witt |
| 3,887,494 A | 6/1975 | Dietz |
| 4,280,141 A | 7/1981 | McCann et al. |
| 4,405,501 A | 9/1983 | Witt |
| 4,446,243 A | 5/1984 | Chester et al. |
| 4,501,885 A | 2/1985 | Sherk et al. |
| 4,547,557 A | 10/1985 | McDaniel |
| 4,588,790 A | 5/1986 | Jenkins, III et al. |
| 4,981,831 A | 1/1991 | Knudsen et al. |
| 5,183,792 A | 2/1993 | Wang et al. |
| 5,284,926 A | 2/1994 | Benham et al. |
| 5,352,749 A | 10/1994 | DeChellis et al. |
| 5,426,082 A | 6/1995 | Marsden |
| 5,436,304 A | 7/1995 | Griffin et al. |

(Continued)

FOREIGN PATENT DOCUMENTS

| EP | 0088989 A2 | 9/1983 |
| EP | 0314385 A2 | 5/1989 |

(Continued)

OTHER PUBLICATIONS

Bird, R. Byron, et al., "Dynamics of polymeric liquids," Fluid Mechanics, 1987, pp. 171-172 plus 8 pages including cover, publishing, and contents information, vol. 1, Second Edition, John Wiley & Sons, Inc.

(Continued)

*Primary Examiner* — Ling Choi
*Assistant Examiner* — Catherine S Branch
(74) *Attorney, Agent, or Firm* — Rodney B. Carroll; Cheryl L. Huseman; Conley Rose, P.C.

(57) ABSTRACT

A method of preparing a catalyst comprising contacting an acidic colloidal silica suspension with a titanium-containing compound to form a mixture, adjusting the pH of mixture to about neutral to form a catalyst support, and contacting the catalyst support with chromium-containing compound to from a chromium-supported catalyst. A catalyst support prepared by contacting a colloidal silica suspension and a titanium-containing compound under acidic conditions to form a mixture, and contacting the mixture with a basic material in an amount sufficient to increase the pH of the mixture to about 7.

20 Claims, 2 Drawing Sheets

(56) References Cited

U.S. PATENT DOCUMENTS

| | | | |
|---|---|---|---|
| 5,455,314 | A | 10/1995 | Burns et al. |
| 5,478,898 | A * | 12/1995 | Standaert ................... 526/65 |
| 5,565,175 | A | 10/1996 | Hottovy et al. |
| 5,575,979 | A | 11/1996 | Hanson |
| 6,239,235 | B1 | 5/2001 | Hottovy et al. |
| 6,262,191 | B1 | 7/2001 | Hottovy et al. |
| 6,624,324 | B2 | 9/2003 | Iwakura et al. |
| 6,657,023 | B2 | 12/2003 | Bergmeister et al. |
| 6,707,498 | B1 | 3/2004 | Toma et al. |
| 6,833,415 | B2 | 12/2004 | Kendrick et al. |
| 6,855,781 | B2 | 2/2005 | Bergmeister et al. |
| 7,088,394 | B2 | 8/2006 | Rossi et al. |
| 7,390,395 | B2 | 6/2008 | Elomari |
| 7,700,516 | B2 | 4/2010 | McDaniel et al. |
| 2004/0026324 | A1 | 2/2004 | Luca |
| 2005/0153830 | A1 | 7/2005 | Jensen et al. |

FOREIGN PATENT DOCUMENTS

| | | |
|---|---|---|
| EP | 0085857 B1 | 8/1989 |
| EP | 0337365 A2 | 10/1989 |
| EP | 0339571 A1 | 11/1989 |
| EP | 0439294 A1 * | 7/1991 |
| EP | 0455444 A1 | 11/1991 |
| EP | 0589643 A1 | 3/1994 |
| EP | 1845110 A1 | 10/2007 |
| WO | 9311173 A1 | 6/1993 |
| WO | 2009042149 A2 | 4/2009 |
| WO | 2009042149 A3 | 4/2009 |
| WO | 2010034464 A1 | 4/2010 |
| WO | 2012040144 A1 | 3/2012 |
| WO | 2013081826 A1 | 6/2013 |
| WO | 2013082346 A2 | 6/2013 |
| WO | 2013082346 A3 | 6/2013 |

OTHER PUBLICATIONS

Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, No. 31, American Chemical Society.

Conway, Steven J., et al., "Chromia/silica-titania cogel catalysts for ethene polymerisation," J. Chem. Soc., Faraday Trans. I, 1989, pp. 71-78, vol. 85, No. 1.

Conway, Steven J., et al., "Chromia/silica-titania cogel catalysts for ethene polymerisation," J. Chem. Soc., Faraday Trans. I, 1989, pp. 79-90, vol. 85, No. 1.

Conway, Steven J., et al., "Chromia/silica-titania cogel catalysts for ethene polymerisation," J. Chem. Soc., Faraday Trans. I, 1989, pp. 1841-1851, vol. 85, No. 7.

Ellison, Alan, et al., "Characterisation of Cr/silica catalysts; Part 2. -Ti- and Mg-modified catalysts," J. Chem. Soc., Faraday Trans., 1993, pp. 4393-4395, vol. 89, No. 24.

Ellison, Alan, et al., "Characterisation of modified Cr-silica catalysts," Journal of Molecular Catalysis, 1994, pp. 81-86, vol. 90, Elsevier Science B.V.

Foreign communication from a related counterpart application—International Search Report and Written Opinion, PCT/US2008/011068, Mar. 23, 2009, 18 pages.

Hieber, C. A., et al., "Some correlations involving the shear viscosity of polystyrene melts," Rheologica Acta, 1989, pp. 321-332, vol. 28, No. 4.

Hieber, C. A., et al., "Shear-rate-dependence modeling of polymer melt viscosity," Polymer Engineering and Science, Jul. 1992, pp. 931-938, vol. 32, No. 14.

Mabilon, G., et al., "Copolymérisation éthyléne-propyléne par des catalyseurs à l'oxyde de chrome," Eur. Polym. J., 1985, pp. 245-249, vol. 21, No. 3, Pergamon Press Ltd.

McDaniel, M. P., et al., "The activation of the Phillips polymerization catalyst," Journal of Catalysis, 1983, pp. 118-126, vol. 82, Academic Press, Inc.

Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.

Pullukat, Thomas J., et al., "Titanium modified chromium catalysts for ethylene polymerization," Symposium on Transition Metal Catalysts Polymerization, Michigan Molecular Institute, Aug. 1981, pp. 697-712.

Rebenstorf, B., et al., "Influence of chromium concentration and addition of fluorine, titanium, or boron on the chromium species of the Phillips catalyst: a quantitative evaluation," Langmuir, 1991, pp. 2160-2165, vol. 7, No. 10, American Chemical Society.

Yu, Youlu, et al., "Size-exclusion chromatography coupled to multiangle light scattering detection of long-chain branching in polyethylene made with phillips catalyst," Journal of Polymer Science Part A: Polymer Chemistry, 2012, pp. 1166-1173, vol. 50, Wiley Periodicals, Inc.

Product Information, LUDOX® SM-AS Colloidal Silica, 2005, W. R. Grace & Co.-Conn., 2 pages.

Filing receipt and specification for patent application entitled "Long chain branched polymers and methods of making same," by Youlu Yu, et al., filed Nov. 30, 2011 as U.S. Appl. No. 13/308,289.

International Application PCT/US2012/067175 Partial Search Report dated Apr. 12, 2013.

Foreign communication from a related counterpart application—International Search Report and Written Opinion, PCT/US2012/067175, Jun. 18, 2013, 23 pages.

Foreign communication from a related counterpart application—International Preliminary Report on Patentability, PCT/US2012/067175, Jun. 3, 2014, 16 pages.

Foreign communication from a related counterpart application—International Search Report and Written Opinion, PCT/US2012/064986, Jan. 25, 2013, 8 pages.

Foreign communication from a related counterpart application—International Preliminary Report on Patentability, PCT/US2012/064986, Jun. 3, 2014, 5 pages.

Foreign communication from a related counterpart application—International Preliminary Report on Patentability, PCT/US2008/011068, Mar. 30, 2010, 11 pages.

Foreign communication from a related counterpart application—Partial Search Report, Annex to Form PCT/ISA/206, PCT/US2012/067175, Apr. 12, 2013, 4 pages.

Notice of Allowance dated Jan. 8, 2015 (20 pages), U.S. Appl. No. 13/308,289, filed Nov. 30, 2011.

Yu, Youlu, et al., "SEC-MALS method for the determination of long-chain branching and long-chain branching distribution in polyethylene," Polymer, 2005, pp. 5165-5182, vol. 46, Elsevier Ltd.

* cited by examiner

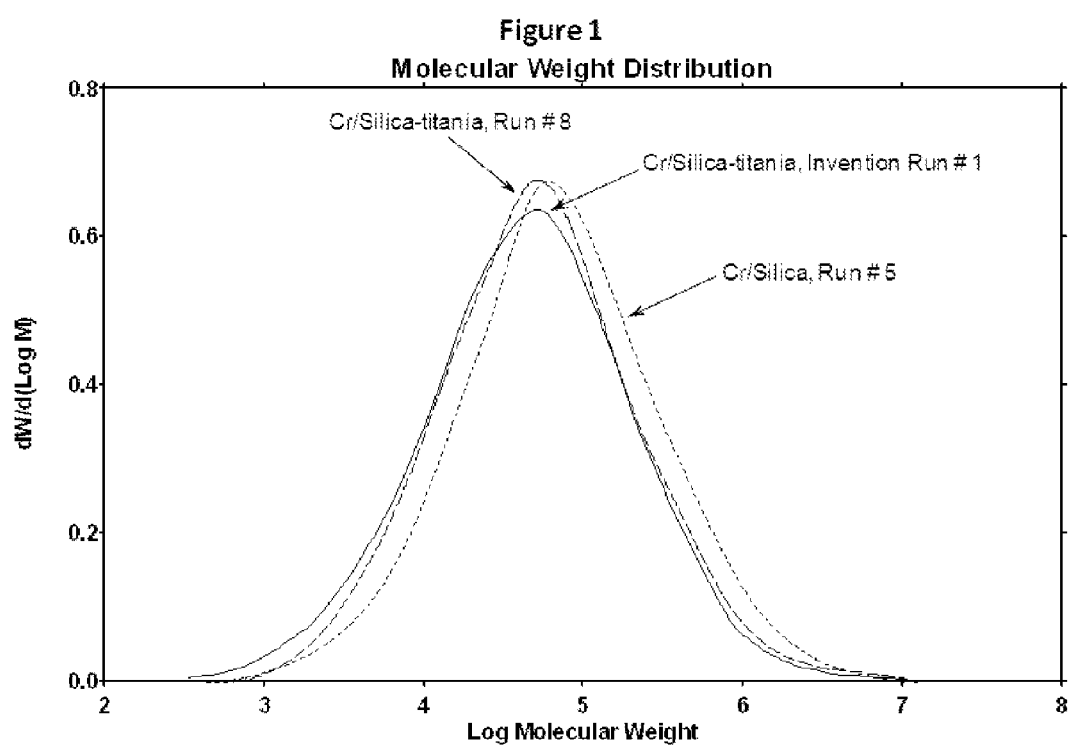

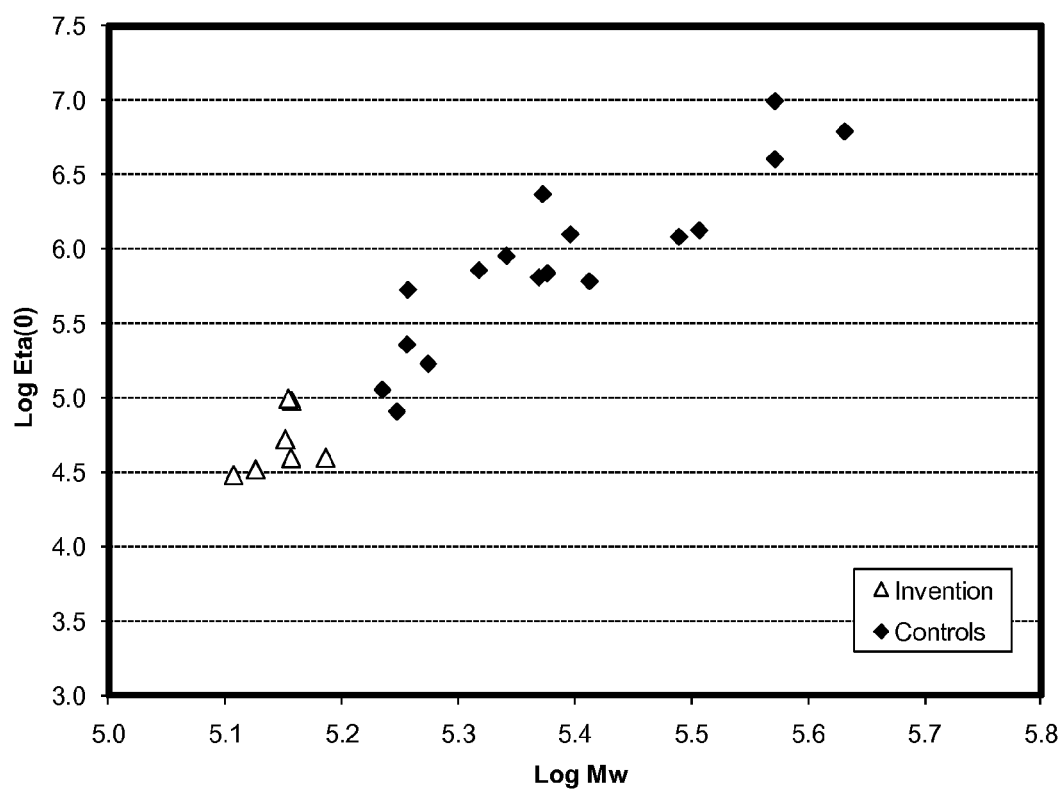

US 9,096,699 B2

METHODS OF PREPARING A CATALYST

TECHNICAL FIELD

The present disclosure relates to catalyst compositions. More specifically, the present disclosure relates to methods of preparing olefin polymerization catalyst compositions.

BACKGROUND

Enhancements in preparation methods for olefin polymerization catalysts can reduce the costs associated with catalyst production and improve process economics. Thus, there is an ongoing need to develop new methods of preparing olefin polymerization catalysts.

SUMMARY

Disclosed herein is a method of preparing a catalyst comprising contacting an acidic colloidal silica suspension with a titanium-containing compound to form a mixture, adjusting the pH of mixture to about neutral to form a catalyst support, and contacting the catalyst support with chromium-containing compound to from a chromium-supported catalyst.

Also disclosed herein is a catalyst support prepared by contacting a colloidal silica suspension and a titanium-containing compound under acidic conditions to form a mixture, and contacting the mixture with a basic material in an amount sufficient to increase the pH of the mixture to about 7.

BRIEF DESCRIPTION OF THE DRAWINGS

FIG. 1 is a graphical representation of molecular weight distribution profiles for the samples from Example 1.

FIG. 2 is a plot of the zero shear viscosity as a function of molecular weight for the samples from Example 1.

DETAILED DESCRIPTION

Disclosed herein are methods for the preparation of catalysts and catalyst supports. In an embodiment, the catalyst support is a silica-titania (Si—Ti) support which is used to produce a polymerization catalyst such as a chromium-supported catalyst (Cr/Si—Ti). The methodologies disclosed herein for the preparation of a catalyst support (e.g., Si—Ti) may be more efficient and less expensive than conventional methods for preparation of a catalyst support. The catalyst supports provided herein are novel forms of silica-titania hydrogels that are characterized by the uniform dispersion of titania onto a silica material without coprecipitation of the silica and titania or coating of the titania onto a pre-formed silica solid structure.

In an embodiment, a method of preparing a catalyst support comprises contacting a silica-source material with a titanium-containing compound. In an embodiment the silica-source material comprises a colloidal silica. Herein, a colloidal silica refers to a suspension of fine-sized amorphous, nonporous silica particles in a liquid phase. In an embodiment, the silica particles are nanoparticles where nanoparticles herein refers to particles that have diameters ranging from about 1 nm to about 2500 nm. In some embodiments, the colloidal silica particles are spherical in shape. In alternative embodiments, the colloidal silica particles may be of any shape that is compatible with the disclosed methodologies. The silica particles in the colloidal silica may be suspended in a liquid medium (e.g. aqueous) and stabilized in the medium using any suitable methodology. For example, the silica particles may be electrostatically stabilized in an aqueous medium. In an embodiment, the colloidal silica may exhibit a particle density of from about 2.1 g/cc to about 2.3 g/cc. In an embodiment, the colloidal silica may comprise silica particles with particle diameters ranging from about 1 nm to about 100 nm; alternatively from about 2 nm to about 100 nm; alternatively from about 2 nm to about 15 nm; or alternatively from about 3 nm to about 10 nm. In an embodiment, a colloidal silica suitable for use in the present disclosure contains greater than about 10 weight percent (wt. %) silica based on the total weight of the suspension, alternatively greater than about 20 wt. %, 30 wt. %, 35 wt. % or alternatively equal to or less than about 40 wt. %. A colloidal silica suitable for use in this disclosure may be further characterized as a monodisperse suspension of silica particles where monodisperse refers to the silica particles being of approximately the same size and shape. In an alternative embodiment, a colloidal silica suitable for use in this disclosure may be further characterized as a polydisperse suspension of silica particles wherein polydisperse refers to the silica particles having a range of sizes and/or shapes. In an embodiment, a colloidal silica suitable for use in the present disclosure is acidic and characterized by a pH of from about 2 to about 6, alternatively from about 3 to about 6, or alternatively from about 4 to about 6. The colloidal silica suspension may also be characterized as having a low sodium content such that the amount of sodium present in the colloidal silica suspension is less than about 0.5 wt. % based on the total weight of the colloidal silica suspension, alternatively less than about 0.3 wt. %, or alternatively less than about 0.2 wt. %.

In an embodiment, a colloidal silica suitable for use in the present disclosure is stabilized in solution by an acidic material such as hydrochloric acid or a basic material such as ammonium hydroxide. In such embodiments, the colloidal silica suspension is acidic and characterized by a pH of from about 0 to 4 or basic and characterized by a pH of from about 8 to about 12, alternatively from about 9 to about 11, or alternatively from about 9 to about 10.

In an embodiment, a silica-source material suitable for use in the present disclosure excludes a material comprising a pre-formed network of silica molecules. For example, the silica-source material may exclude a precipitated or gelled silica. Herein, a gelled or precipitated silica refers to a silica which consists of a three-dimensional network of primary silica particles. Without wishing to be limited by theory, it is contemplated that a silica-source material suitable for use in the present disclosure is characterized by the presence of individual silica particles that maintain discrete boundaries for the individual particles and lack any long range ordering or aggregation of the particles (e.g., do not exist in networks prior to catalyst formation). As such, silica-source materials suitable for use in the present disclosure may be characterized as having a greater degree of accessible surface area per particle when compared to silica-source materials that contain a network of silica particles or aggregates of silica particles. Herein, accessible surface area refers to areas of the particle not associated with or directly participating in inter-particle interactions (e.g., contact area between particles) that result in organization of the silica particles into a larger structure.

In an embodiment, a silica-source material suitable for use in the present disclosure has less than about 20% of the total number of silica particles involved in a network or aggregate containing greater than about 100 silica particles, alternatively less than about 10%, alternatively less than about 5%, or alternatively less than about 1%. The presence and amounts silica particle networks or aggregates of silica in a silica-source material may be determined using any suitable methodology such as for example light-scattering techniques.

Hereinafter, the disclosure will refer to the use of a colloidal silica as the silica-source material although other silica-source materials having the herein described properties are also contemplated as being suitable for use.

In an embodiment, the titanium-containing compound comprises a tetravalent titanium ($Ti^{4+}$)-containing compound. The $Ti^{4+}$-containing compound may be any compound that comprises tetravalent titanium, alternatively the $Ti^{4+}$-containing compound may be any compound that is soluble in an aqueous solution and able to release a $Ti^{4+}$ species into solution. Examples of $Ti^{4+}$-containing compounds suitable for use in the present disclosure include without limitation titanyl nitrate.

In an embodiment, a method of preparing a catalyst comprises contacting the support with an aqueous solution comprising a trivalent titanium ($Ti^{3+}$)-containing compound. The $Ti^{3+}$-containing compound may be any compound that comprises trivalent titanium, alternatively the $Ti^{3+}$ containing compound may be any compound that is soluble in an aqueous solution and able to release a Ti species into solution. Examples of $Ti^{3+}$-containing compounds suitable for use in the present disclosure include without limitation $TiCl_3$, $(Ti)_2(SO_4)_3$, $Ti(OH)Cl_2$, $TiBr_3$, and the like.

Such compounds may be contacted with a silica-source material of the type disclosed herein (e.g., colloidal silica suspension) using techniques to be described in more detail later herein to yield a percentage titanium of from about 0.1% to about 10%, alternatively from about 0.5 wt. % to about 8 wt. %, alternatively from about 1 wt. % to about 5 wt. %. Herein, the percentage titanium refers to the final percent titanium associated with the catalyst support by total weight of the material after all processing steps.

In an embodiment, a method of preparing a catalyst support comprises contacting a colloidal silica suspension with a tetravalent or trivalent titanium-containing compound. For example, the tetravalent or trivalent-titanium-containing compound may be dissolved in the colloidal silica in the amounts disclosed herein to form a mixture. The pH of the mixture may be the same as or similar to the pH of the colloidal silica suspension. In an embodiment, the colloidal silica suspension is acidic and the method further comprises adjusting the pH of the mixture to neutrality, alternatively to a pH of about 7, by the addition of a basic material. Any basic material that is compatible with the components of the mixture may be employed to adjust the pH of the mixture to neutrality or about a pH of 7 is suitable for use in the present disclosure.

In an alternative embodiment, a method of preparing a catalyst support comprises contacting a colloidal silica suspension having a basic pH within the ranges disclosed herein with an acidic solution of the tetravalent or trivalent titanium-containing compound. For example, an acidic solution of the tetravalent or trivalent-titanium-containing compound may be contacted with the basic colloidal silica suspension in the amounts disclosed herein to form a mixture. In an embodiment, the method further comprises adjusting the pH of the mixture to neutrality, alternatively to a pH of about 7. Any material that is able to adjust the pH of the mixture to neutrality or about a pH of 7 and is compatible with the components of the mixture is suitable for use in the present disclosure.

Without wishing to be limited by theory, upon neutralization of the mixture $Ti^{+4}$ or $Ti^{+3}$ precipitates onto the individual silica particles of the colloidal silica suspension. The individual silica particles with the precipitated $Ti^{+4}$ or $Ti^{+3}$ may then form a gel network resulting in a silica-titania hydrogel. The Si—Ti hydrogel thus formed may be differentiated from a Si—Ti co-precipitate as the colloidal silica particles are in solution prior to the precipitation of $Ti^{+4}$ or $Ti^{+3}$ and there is no fusion or coalescence of the silica particles at the time of gellation. Further, the Si—Ti hydrogel of this disclosure may be differentiated from a titanium-coated silica as the $Ti^{+4}$ or $Ti^{+3}$ may attach to the entire surface of the silica particle including the points of contact of a silica particle with other silica particles and there is no fusion or coalescence of the silica particles. For example, $Ti^{+4}$ or $Ti^{+3}$ may find points of attachment available on greater than about 90% of the surface area of the silica particle, alternatively greater than about 95, 99 or 99.9% of the surface area of the silica particle. Hereinafter, the catalyst support comprises a Si—Ti hydrogel of the type disclosed herein.

In an embodiment, a method of preparing a catalyst support optionally comprises aging the catalyst support. For example, the catalyst support may be alkaline aged by contacting the catalyst support with an alkaline solution containing one or more basic compounds (e.g., bases, buffer) having a pH of from about 8 to about 13, alternatively from about 9 to about 12, alternatively from about 9 to about 10 at a temperature of from about 60° C. to about 90° C., or from about 70° C. to about 85° C., or at about 80° C. The alkaline solution may be comprised of any components which provide a solution pH in the disclosed ranges and are compatible with the other components of the composition. For example, the alkaline solution may comprise ammonium hydroxide, potassium hydroxide, sodium hydroxide, trialkylammonium hydroxide, sodium silicate and the like. Other suitable compounds and amounts effective to provide a solution in the disclosed pH ranges may be utilized.

In an alternative embodiment, the catalyst support may be aged by contact with a neutral solution (neutral aging) having a pH of about 7 at a temperature of from about 60° C. to about 90° C., or from about 70° C. to about 85° C., or at about 80° C.

Optional aging of the silica hydrogel (alkaline or neutral) may be carried out for a time period sufficient to lower the surface area of the silica support to less than about 50% of the original value of the surface area of an otherwise similar material that has not been aged, alternatively to less than about 45%, 40%, or 35%. In an embodiment, the aging is carried out for a period of time of from about 1 hour to about 24 hours, or from about 2 hours to about 10 hours, or from about 3 hours to about 6 hours.

In an embodiment, the method further comprises drying the catalyst support. The catalyst support may be dried to remove solvent and form a dried catalyst support. The drying may be carried out in a temperature range of from about 25° C. to about 300° C., alternatively from about 50° C. to about 200° C., or alternatively from about 80° C. to about 150° C. and for a time of from about 0.1 min to about 10 hours, alternatively from about 0.2 min to about 5 hours, or alternatively from about 30 min to about 1 hour. The method may further comprise calcining the dried catalyst support to form a dried calcined catalyst support. For example, the dried catalyst support may be calcined in the presence of air at a temperature in the range of from about 400° C. to about 1,000° C., alternatively from about 500° C. to about 900° C., and for a time of from about 1 hour to about 30 hours, alternatively from about 2 hours to about 20 hours, or alternatively from about 5 hours to about 12 hours.

In an embodiment, a method for preparation of a catalyst support may exclude alkaline aging of the catalyst support. In an embodiment, a method for preparation of a catalyst support may exclude neutral aging of the catalyst support.

In an embodiment, the catalyst support prepared as described herein is substantially free of sodium. Herein, "substantially free" refers to sodium being present in an amount of less than about 0.5 wt. % based on the total weight of the catalyst support, alternatively less than about 0.2 wt. %, or alternatively less than about 0.1 wt. %. In an embodiment, a method of preparing a catalyst support of the type disclosed herein excludes treating the support to reduce the amount of sodium present in the material. In an embodiment, any suitable methodology for treating the catalyst and/or catalyst support to reduce the amount of sodium present may be excluded from the disclosed methodology. For example, in a conventional method for the preparation of a catalyst support the catalyst support may be subjected to one or more washes with a solution to reduce the amount of sodium present in the material. Such washes may occur before and/or after the addition of one or more catalytically active metals to the catalyst support. Such washes may comprise contacting the catalyst and/or catalyst support with water and/or an aqueous solution containing one or more materials that function to specifically reduce the amount of sodium present in the material. Catalysts and/or catalyst supports of the type described herein may be prepared without contacting the catalyst and/or catalyst support with one or more solutions that function to reduce the amount of sodium present in the material.

The catalyst support may further include additional components that do not adversely affect the catalyst, such as zirconia, alumina, boria, thoria, magnesia, or mixtures thereof. The catalyst support may have a surface area and pore volume effective to provide for an active catalyst. The surface area of the catalyst support may range from about 100 square meters per gram ($m^2/g$) to about 1,000 $m^2/g$, alternatively from about 200 $m^2/g$ to about 800 $m^2/g$, or from about 250 $m^2/g$ to about 500 $m^2/g$. The pore volume of the catalyst support may range from about 0.5 cubic centimeters per gram (cc/g) to about 3.5 cc/g or alternatively from about 0.8 cc/g to about 3 cc/g while the average pore diameter of the catalyst support may range from about 50 Å to about 1000 Å, alternatively from about 75 Å to about 500 Å, or alternatively from about 100 Å to about 300 Å.

In an embodiment, a method of forming a catalyst comprises contacting a catalyst support of the type disclosed herein (e.g., Si—Ti support) with a chromium-containing compound to form Cr/Si—Ti compound that may be further processed (e.g., activated) to form a supported chromium catalyst (e.g., a chromium silica-titania catalyst or CTSC). The chromium-containing compound may be a water-soluble compound or a hydrocarbon-soluble compound. Examples of water-soluble chromium compounds include chromium trioxide, chromium acetate, chromium nitrate, or combinations thereof. Examples of hydrocarbon-soluble chromium compounds include tertiary butyl chromate, a diarene chromium (O) compound, biscyclopentadienyl chromium(II), chromium (III) acetylacetonate, or combinations thereof. In one embodiment, the chromium-containing compound may be a chromium (II) compound, chromium (III) compound, or combinations thereof. Suitable chromium (III) compounds include, but are not limited to, chromium carboxylates, chromium naphthenates, chromium halides, chromium sulfate, chromium nitrate, chromium dionates, or combinations thereof. Specific chromium (III) compounds include, but are not limited to, chromium (III) sulfate, chromium (III) chloride, chromium (III) nitrate, chromic bromide, chromium (III) acetylacetonate, chromium (III) acetate. Suitable chromium (II) compounds include, but are not limited to, chromous chloride, chromous bromide, chromous iodide, chromium (II) sulfate, chromium (II) acetate, or combinations thereof.

The amount of chromium present in the catalyst may range from about 0.01% to about 10% by weight of the catalyst, alternatively from about 0.2% to about 5%, or from about 0.5% to about 2. Herein, the percentage chromium refers to the final percent chromium associated with the support material by total weight of the material after all processing steps.

The Cr/Si—Ti compound may be dried again to remove solvent introduced by the addition of the chromium-containing compound at temperatures ranging from 25° C. to about 300° C., alternatively from about 50° C. to about 200° C., or alternatively from about 80° C. to about 150° C. In one embodiment, the dried Cr/Si—Ti may then be activated via a second calcination step by heating it in an oxidizing environment to produce a chromium, titanated silica catalyst (CTSC). For example, the dried Cr/Si—Ti compound may be calcined in the presence of air at a temperature in the range of from about 400° C. to about 1,000° C., alternatively from about 500° C. to about 850° C. and for a time of from about 1 min to about 10 hours, alternatively from about 20 min to about 5 hours, alternatively from about 1 to about 3 hours to produce the CTSC.

The catalysts of the present disclosure (i.e., CTSCs) are suitable for use in any olefin polymerization method, using various types of polymerization reactors. In an embodiment, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually at about 200 psig (1.4 MPa)-500 psig (3.45 MPa). High pressure polymerization in tubular or autoclave reactors is generally run at about 20,000 psig (138 MPa); to 75,000 psig (518 MPa). Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to, density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the CTSCs prepared as described herein. Polymer resins produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth. Additional end use articles would be apparent to those skilled in the art.

EXAMPLES

The following examples are given as particular embodiments of the disclosure and to demonstrate the practice and advantages thereof. It is understood that the examples are given by way of illustration and are not intended to limit the specification or the claims to follow in any manner.

The melt index of a polymer resin represents the rate of flow of a molten resin through an orifice of 0.0825 inch diameter when subjected to a force of 2,160 grams at 190° C. The MI values are determined in accordance with ASTM D1238. Further, the high load melt index of a polymer resin represents the rate of flow of a molten resin through an orifice of 0.0825 inch diameter when subjected to a force of 21,600 grams at 190° C. The HLMI values are determined in accordance with ASTM D1238 condition E.

A "Quantachrome Autosorb-6 Nitrogen Pore Size Distribution Instrument" was used to determine the surface area and pore volume of the supports. This instrument was acquired from the Quantachrome Corporation of Syosset, N.Y. Particle size distribution was determined by light scattering using a Leeds & Northrup Microtrac FRA instrument. A few milligrams of sample was introduced into a stream of circulating water. The particle size distribution was determined by volume weighting from the range of 0.1 to 1000 microns, using 100 channels, and assuming a spherical shape.

Molecular weight and molecular weight distributions were obtained using a PL-GPC 220 (Polymer Labs, UK) system equipped with a differential refractive index detector and three 7.5 mm×300 mm 20 um Mixed A-LS columns (Polymer Labs) running at 145° C. The flow rate of the mobile phase, 1,2,4-trichlorobenzene (TCB) containing 0.5 g/L 2,6-di-t-butyl-4-methylphenol (BHT), was set at 1 mL/min and the concentration of polymer solutions was generally kept in the range of 1.0-1.5 mg/mL, depending on the molecular weights. Sample preparation was conducted at 150° C. for 4 h with occasional and gentle agitation before the solutions being transferred to sample vials for injection. In order to minimize unbalanced solvent peak, solvent with the same composition as the mobile phase was used for solution preparation. The integral calibration method was employed to deduce molecular weights and molecular weight distributions using a Chevron Phillips Chemicals Company's broad linear polyethylene, Marlex BHB5003, as the broad standard. The integral table of the broad standard was pre-determined in a separate experiment with SEC-MALS. $M_n$ is the number-average molecular weight (g/mol); $M_w$ is the weight-average molecular weight (g/mol); $M_z$ is the z-average molecular weight (g/mol); $M_v$ is the viscosity-average molecular weight (g/mol); and $M_p$ is the peak molecular weight.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—η0, characteristic viscous relaxation time—τη, and the breadth parameter—a. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein:
|η*(ω)|=magnitude of complex shear viscosity;
$\eta_0$=zero shear viscosity; $\Sigma_\eta$=viscous relaxation time;
a="breadth" parameter;
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

Example 1

A catalyst support and catalyst of the type disclosed herein was prepared. A clear, colloidal suspension of silica nanoparticles was obtained under the commercial name of LUDOX AS-SM from W.R. Grace Co. The colloidal silica suspension contained nano-particles corresponding to a surface area of about 300 m$^2$/g, in the amount of 25% by weight. 75 grams of this suspension was then added to a beaker, followed by 15 grams of an acidic TiOSO$_4$ solution containing 8.5 wt. % Ti$^{4+}$. The solution also contained a sufficient amount of sulfuric acid to bring the mixture to a pH of approximately 2 or less. The amount of Ti$^{4+}$ added was sufficient to provide titanyl sulfate to equal 4.3 wt. % Ti on the final catalyst. To this suspension was then added a few drops of concentrated NH$_4$OH with vigorous stirring. When the pH of the suspension reached neutrality, the entire contents of the beaker set up into a hard gel, which stopped the magnetic stirrer. The gel was then broken up into smaller pieces and added to 2 L of n-propanol, where it was stirred at about 80° C. for half an hour.

After half an hour of stirring in the n-propanol, the gel was then allowed to settle to the bottom of the beaker, and the alcohol was poured off. Then 30 mL of a methanol solution of basic Cr-acetate was added, which contained 0.01 g Cr per mL (1 wt. % Cr on the catalyst). After half an hour of stirring, 2 L of heptane was added followed by another half an hour of stirring. The solid was allowed to settle to the bottom of the beaker, and the green color of the chromium also selectively went to the bottom of the beaker, indicating that it was in the gel. Then, the heptane was poured off, and the gel collected. It was placed in a vacuum oven at 110° C. overnight. The dried catalyst was then pushed through a 35 mesh screen.

To create a catalyst, the green powder was then activated. That is, about 10 grams of the powder was placed in a 1.75 inch quartz tube fitted with a sintered quartz disk at the bottom. While the catalyst was supported on the disk, dry air was blown up through the disk at the linear rate of about 1.6 to 1.8 standard cubic feet per hour, thus fluidizing the catalyst. An electric furnace around the quartz tube was then turned on and the temperature was raised at the rate of 400 degrees centigrade per hour to 700° C. At that temperature, the silica was allowed to fluidize for three hours in the dry air. Afterward the catalyst was cooled to 25° C. in dry air, then flushed with dry nitrogen for 10 minutes, and collected and stored under dry nitrogen. The final catalyst had an orange color, due to the formation of Cr(+6).

Polymerization runs were made in a 2.2 liter steel reactor equipped with a marine stirrer rotating at 400 rpm. The reactor was surrounded by a steel jacket containing boiling methanol with a connection to a steel condenser. The boiling point of the methanol was controlled by varying nitrogen pressure applied to the condenser and jacket.

A small amount (0.01 to 0.10 grams normally) of the solid catalyst was first charged under nitrogen to the dry reactor. Next, 1.2 liter of isobutane liquid was charged and the reactor was heated up to the specified temperature. Finally ethylene was added to the reactor to maintain a fixed pressure, 550 psig (3.7 MPa) which was held constant during the experiment. The stirring was allowed to continue for the specified time, usually about one hour, and the activity was noted by recording the flow of ethylene into the reactor to maintain the set pressure.

After the allotted time, the ethylene flow was stopped and the reactor slowly depressurized and opened to recover a granular polymer powder. In all cases, the reactor was clean with no indication of any wall scale, coating or other forms of fouling. The polymer powder was then removed and weighed. Activity was specified as grams of polymer produced per gram of solid catalyst charged per hour.

The results of polymerization runs using a CTSC of the type disclosed herein are shown in Table 1. Four runs were made, in which the reactor temperature was varied as indicated. The catalyst was active in all of these runs. The polymer yield is listed, along with the melt index (MI) and high load melt index (HLMI), and the shear response (HLMI/MI). The polymers obtained had a high melt index.

TABLE 1

| Run # | Rxn Temp | Run Time min | Catalyst g | Polymer Yield, g | MI g/10 min | HLMI g/10 min | HLMI/MI |
|---|---|---|---|---|---|---|---|
| 1 | 105° C. | 35 | 0.526 | 193 | 1.50 | 85.9 | 57.3 |
| 2 | 105° C. | 93 | 0.1822 | 66 | 1.03 | 60.0 | 58.4 |
| 3 | 103° C. | 54 | 0.4050 | 239 | 0.66 | 42.5 | 64.1 |
| 4 | 107° C. | 81 | 0.6391 | 236 | 1.22 | 64.1 | 52.6 |

Example 2

A number of commercial Cr/silica catalysts were also investigated. All catalysts contained 1 wt. % Cr as in the CSTC described in Example 1. After activation at 700° C., also as accomplished in example 1, these catalysts were then tested for polymerization activity at 105° C. in the same procedure used in example 1. The results of these tests are shown in Table 2. The catalysts used in runs 5 and 6 were 969 MPI and HA30W respectively which are commercially available from WR Grace. Two Cr/silica catalysts were obtained from Inneos (PQ) and in used in runs 7 and 8 and are noted for their high surface area and pore volume. All of these catalysts produced polymer exhibiting both a low MI (melt index) and low HLMI (high load melt index), when compared to the polymers produced using CTSCs of the type disclosed herein (see Table 1).

TABLE 2

| Run # | Catalyst Type | Rxn Temp | Run Time min | Catalyst g | Polymer Yield, g | MI g/10 min | HLMI g/10 min | HLMI/MI |
|---|---|---|---|---|---|---|---|---|
| 5 | 969MPI | 105° C. | 50.2 | 0.2599 | 231 | 0.18 | 13.6 | 75 |
| 6 | HA30W | 105° C. | 43.0 | 0.2049 | 204 | 0.029 | 10.7 | 375 |
| 7 | PQ MS3050 | 105° C. | 120.5 | 0.0549 | 154 | 0.035 | 7.5 | 214 |
| 8 | PQ MS3070 | 105° C. | 40.0 | 0.2794 | 191 | 0.044 | 7.9 | 179 |

The results indicated that CTSCs of the type disclosed herein incorporated titanium into the catalyst as a uniform, well-dispersed coating that had a dramatic effect on the catalyst performance. This is supported by the fact that had the titanium not been so well utilized in the CTSCs prepared as disclosed herein, polymers produced using the CTSC catalysts would exhibit properties similar to those displayed by commercial catalysts which did not contain titanium (see Table 2).

Example 3

The properties of commercial Cr/silica-titania catalysts were compared to CTSCs of the type disclosed herein. Specifically, polymer was produced using either a MAGNAPORE catalyst (Run #9) commercially available from W.R. Grace or a PQ CX36305MS catalyst (Runs #10 and 11) commercially available from Inneos. MAGNAPORE is made by co-precipitation of Si and Ti and contained 2.5 wt. % Ti and 1 wt. % Cr. PQ CX36305MS catalyst is made by depositing a titania mono-layer onto silica, and contained 3.0 wt. % Ti and 1 wt. % Cr. The PQ CX36305MS catalyst had a multi-point surface area of 479 m$^2$/g, a nitrogen pore volume of 2.38 mL/g, an average pore diameter of 199 Å and a loss on drying of 2.1 wt. %. The MAGNAPORE and PQ CX36305MS catalysts were activated at 700° C. as described in example 1, and then tested for polymerization behavior at 105° C. as described in Example 1. The results of these tests are shown in Table 3. The melt index potential of polymers produced using these catalysts was much higher than those of the polymers reported in Table 2, due to the presence of titania incorporated into the catalyst uniformly. Comparing the commercial Cr/silica-titania catalysts in Table 3 to the CTSC catalysts in Table 1, we see that the CTSCs of this disclosure produce polymers having properties that are quite competitive with these commercial Cr/silica-titania catalysts. In fact, the CTSCs of this disclosure generally produced polymers having a little higher MI (melt index) or HLMI (high load melt index) than the polymers produced using the well-accepted, commercial Cr/silica-titania catalysts. These results indicate that the CTSCs of this disclosure contained a well-dispersed mono-layer of Ti that was very effective.

TABLE 3

| Run # | Catalyst Type | Rxn Temp | Run Time min | Catalyst g | Polymer Yield, g | MI g/10 min | HLMI g/10 min | HLMI/MI |
|---|---|---|---|---|---|---|---|---|
| 9 | Magnapore | 105° C. | 52 | 0.0675 | 153 | 0.77 | 49.6 | 64 |
| 10 | PQ CX36305MS | 105° C. | 31 | 0.1045 | 201 | 0.49 | 35.7 | 73 |
| 11 | PQ CX36305MS | 105° C. | 34 | 0.1303 | 238 | 0.78 | 39.4 | 51 |

Example 4

Three catalysts were made to contain titania in which titanyl sulfate was simply impregnated from an aqueous solution onto a pre-formed commercial silica. In the first preparative example in Table 4, HA30W Cr/silica catalyst was impregnated with an aqueous solution of acidic titanyl sulfate in an amount that produced a titanium content of 3.3 wt. % Ti, as measured by X-ray fluorescence. The catalyst was then dried in a vacuum oven at 110° C. overnight and activated at 700° C. as described above. Two polymerization runs using this catalyst preparation were carried out and are designated Run #12 and Run #13. Although this preparation yielded a reasonable surface area and pore volume (see Table 5), the polymerization results, summarized in Table 4, still produced a low MI (melt index) and a low HLMI (high load melt index) polymer. This indicates that the titania was not incorporated in a way that it could influence the chromium active sites. That is, the titania formed clusters and domains, and did not provide a uniform and intimate contact with the silica.

In the second preparative example in Table 4, the same procedure was repeated, with HA30W being impregnated with an aqueous solution of titanyl sulfate. However, in this instance the amount of titanium impregnated was greatly increased, to 10.2 wt. % Ti. Two polymerization runs using this catalyst preparation were carried out and are designated Run #14 and Run #15. Without wishing to be limited by theory it was hypothesized that with the introduction of a large amount of titanium, some of the titania would be incorporated onto the surface where it could influence the Cr active sites. However, as shown in Table 4, once again there was no positive result. In fact, the large amount of titania seems to have killed the catalyst, possibly by plugging some of the pores. Notably, the catalyst displays a loss of surface area, and especially pore volume (see Table 5).

Finally, in the third preparative example in Table 4, titanyl sulfate in acidic aqueous solution was slurried with HA30W Cr/silica catalyst, in the amount of 7 wt. % Ti. Then, instead of immediately drying the mixture, the pH was slowly brought from acid to neutral by slowly dripping $NH_4OH$ into the stirring slurry. The entire process took almost 8 hours to accomplish. Three polymerization runs using this catalyst preparation were carried out and are designated Run#16, Run#17, and Run#18. It was hypothesized that raising the pH would cause precipitation of titania onto the silica. However, Table 4 shows that although $TiO_2$ precipitated, it did not uniformly coat the silica surface, but instead formed a separate precipitate and domain. Thus, once again, low melt index polymer was obtained, indicating an ineffective use of the titania.

This data demonstrates that $TiOSO_4$ cannot be impregnated onto silica to form a uniform, well-dispersed titania layer. Further, these results demonstrate how difficult it is for titanyl sulfate to uniformly coat the surface of silica in an aqueous environment. And yet, using the methods disclosed herein it is indeed possible to obtain effective aqueous titanation starting from titanyl sulfate.

TABLE 4

| Run # | Catalyst Type | Rxn Temp | Run Time Min | Catalyst g | Polymer Yield, g | MI g/10 min | HLMI g/10 min | HLMI/MI |
|---|---|---|---|---|---|---|---|---|
| 10 | 3.3% Ti Impregnated | 95° C. | 66 | 0.3085 | 171 | 0.096 | 9.8 | 103 |
| 11 | 3.3% Ti Impregnated | 105° C. | 77 | 0.1941 | 224 | 0.088 | 10.2 | 116 |
| 12 | 10.2% Ti Impregnated | 105° C. | 83 | 0.2311 | 3.5 | NA | ~10 | NA |
| 13 | 10.2% Ti Impregnated | 105° C. | 45 | 1.0604 | 0 | NA | NA | NA |
| 14 | 7% Ti, Drip method | 105° C. | 77 | 0.0823 | 166 | 0.19 | 15.9 | 82 |
| 15 | 7% Ti, Drip method | 105° C. | 32 | 0.1427 | 120 | 0.19 | 17.5 | 94 |
| 16 | 7% Ti, Drip method | 105° C. | 162 | 0.1748 | 44 | 0.22 | 19.8 | 90 |

The catalysts prepared in Examples 1-3 were subjected to nitrogen porosimetry, and the results are shown in Table 5, including the surface area, the pore volume, and the average pore diameter of each. CTSCs of the type disclosed herein, Run #1, exhibited high porosity, despite the lack of reinforcement caused by alkaline aging. In fact, CTSCs of the type disclosed herein, Run #1, displayed the largest pore diameter of any of the catalysts investigated, which accounts in part for its higher melt index capability. Notably, CTSCs of the type disclosed herein, Run #1, displayed normal surface area and pore volume.

TABLE 5

| Run # | Catalyst Type | Catalyst Grade | Surface Area m²/g | Pore Volume cc/g | Avg. Pore Diameter Angstrom |
|---|---|---|---|---|---|
| 1 | Cr/Silica-titania | CTSC of this disclosure | 285 | 1.53 | 215 |
| 5 | Cr/Silica | 969MPI | 279 | 1.49 | 214 |
| 6 | Cr/Silica | HA30W | 517 | 1.42 | 110 |
| 7 | Cr/Silica | PQ MS3050 | 505 | 2.41 | 191 |
| 8 | Cr/Silica | PQ MS3070 | 687 | 2.39 | 139 |
| 9 | Cr/Silica-titania | MAGNAPORE | 526 | 2.50 | 190 |
| 10 | Cr/Silica-titanic | PQ CX36305MS | 508 | 2.52 | 198 |
| 12 | Cr/Silica-titania | Ti Impregnated on HA30W | 468 | 1.57 | 134 |
| 14 | Cr/Silica-titania | Ti Impregnated on HA30W | 356 | 0.84 | 94 |
| 16 | Cr/Silica-titania | Ti Impregnated on HA30W | 477 | 1.48 | 124 |

Size exclusion chromatography was conducted on several of the polymers described in the tables above. The molecular weight distributions of three polymers are shown in FIG. 1. There are noticeable differences in the MWD of polymers produced using a Cr/silica catalyst (e.g., Run #5) and polymers produced using a Cr/silica-titania catalyst (Run #9). In addition to the overall lower MW, titania also tends to produce a shoulder on the low-MW side of the distribution. Also shown in FIG. 1 is the MWD of a polymer produced using a CTSC of the type disclosed herein (Run #1). The MWD of a polymer produced using a CTCSC of the type disclosed herein strongly resembles the MWD of a polymer produced using a commercial Cr/silica-titania control catalyst (Run #9). Notably, the polymer produced using a CTSC of the type disclosed herein displays even slightly lower MW than Run #9. This is strong evidence that the titania on a CTSC of the type disclosed herein was well dispersed and significantly influenced the chromium. Otherwise, the polymer produced from the CTSC (Run #1) would have more closely resembled the polymer produced using a commercial Cr/silica catalyst Run #5.

FIG. 2 is a plot of the log of the zero-shear viscosity, obtained at 190° C. by extrapolation of the Carreau-Yasuda curve, against the log of the weight-average molecular weight, for all of the resins in the tables above. This type of plot is often used as a measure of the amount of long chain branching (the elasticity) in the resin. Notably, all of the points fall approximately on the same line. Polymers produced by CTSCs of the type disclosed herein are at one end of the line because of the lower MW that they produced, but the viscosity forms a single line with the other materials. This indicates that polymers produced by CTSCs of the type disclosed herein do not contain any more long chain branching than the reference polymers produced from other chromium catalysts, including the other Cr/silica-titania catalysts. This indicates that polymers produced using CTSCs of the type disclosed herein will be useful in blow-molding and film applications, among others.

While various embodiments have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of preparing a catalyst comprising:
   contacting an acidic colloidal silica suspension with a titanium-containing compound to form a mixture;
   adjusting the pH of the mixture to about neutral to form a catalyst support; and
   contacting the catalyst support with a chromium-containing compound to form a chromium-supported catalyst, wherein the catalyst and/or catalyst support is not alkaline aged.

2. The method of claim 1 wherein the colloidal silica suspension comprises silica particles with a particle diameter of from about 1 nm to about 100 nm.

3. The method of claim 1 wherein the colloidal silica suspension has silica present in an amount of greater than about 10 wt. % based on the total weight of the suspension.

4. The method of claim 1 wherein the colloidal silica suspension has sodium present in an amount of less than about 0.5 wt. %.

5. The method of claim 1 wherein the titanium-containing compound comprises trivalent titanium, tetravalent titanium, or both.

6. The method of claim 5 wherein the tetravalent titanium comprises $TiCl_4$, $TiOSO_4$, $TiBr_4$, or combinations thereof.

7. The method of claim 1 wherein a percentage titanium in the catalyst support is from about 0.1 wt. % to about 10 wt. % based on the final weight of the catalyst support.

8. The method of claim 1 wherein the chromium-containing compound comprises a water-soluble compound or a hydrocarbon-soluble compound.

9. The method of claim 8 wherein the water-soluble compound comprises chromium trioxide, chromium acetate, chromium nitrate, or combinations thereof.

10. The method of claim 8 wherein the hydrocarbon-soluble compound comprises tertiary butyl chromate, a diarene chromium (0) compound, biscyclopentadienyl chromium(II), chromium (III) acetylacetonate, or combinations thereof.

11. The method of claim 1 wherein the chromium is present in an amount of from about 0.01 wt. % to about 10 wt. % based on the final weight of the catalyst.

12. The method of claim 1 wherein the catalyst and/or catalyst support is not treated to reduce the amount of sodium present.

13. A method of preparing a catalyst comprising:
contacting a colloidal silica suspension with a titanium-containing compound under acidic conditions to form a mixture, wherein the colloidal silica suspension has silica present in an amount of greater than about 20 wt. % based on the total weight of the suspension;
contacting the mixture with a basic material in an amount sufficient to increase the pH of the mixture to about 7 to form a catalyst support; and
contacting the catalyst support with a chromium-containing compound to form a chromium-supported catalyst.

14. The method of claim 13 wherein sodium is present in an amount of less of than about 0.5 wt. % based on the total weight of the catalyst support.

15. The method of claim 13 wherein a percentage titanium in the catalyst support is from about 0.1 wt. % to about 10 wt. % based on the final weight of the catalyst support.

16. The chromium-containing catalyst prepared by the method of claim 1.

17. The method of claim 1, further comprising contacting the chromium-containing catalyst with ethylene and an optional comonomer under conditions suitable for the formation of an ethylene polymer.

18. The method of claim 13 wherein the titanium-containing compound comprises trivalent titanium, tetravalent titanium, or both.

19. The method of claim 18 wherein the tetravalent titanium comprises $TiCl_4$, $TiOSO_4$, $TiBr_4$, or combinations thereof.

20. The method of claim 13 wherein the chromium-containing compound comprises a water-soluble compound or a hydrocarbon-soluble compound.

\* \* \* \* \*